United States Patent
Zhan

(10) Patent No.: US 9,904,838 B2
(45) Date of Patent: Feb. 27, 2018

(54) FINGERPRINT DETECTION CIRCUIT, AND CAPACITIVE FINGERPRINT SENSOR AND MOBILE TERMINAL THEREOF

(71) Applicant: Shenzhen Goodix Technology Co., Ltd., Shenzhen (CN)

(72) Inventor: Chang Zhan, Shenzhen (CN)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 4 days.

(21) Appl. No.: 15/243,862

(22) Filed: Aug. 22, 2016

(65) Prior Publication Data
US 2016/0358006 A1 Dec. 8, 2016

Related U.S. Application Data

(63) Continuation of application No. PCT/CN2015/073823, filed on Mar. 6, 2015.

(30) Foreign Application Priority Data

Sep. 29, 2014 (CN) .......................... 2014 1 0515210

(51) Int. Cl.
*G06K 9/00* (2006.01)

(52) U.S. Cl.
CPC .................. *G06K 9/0002* (2013.01)

(58) Field of Classification Search
CPC .. G06K 9/0002; G06K 9/00053; G06K 9/001; G06K 9/00019; G06K 9/00026; G06K 9/00084; G06K 9/00065; G06K 9/00013; G06F 3/044; H03M 1/002; H03M 1/368; H03M 1/001; H03M 1/148
See application file for complete search history.

(56) References Cited

U.S. PATENT DOCUMENTS

| | | | |
|---|---|---|---|
| 8,574,658 B1 * | 11/2013 | Cambrea | A61B 5/1172 427/1 |
| 2004/0026635 A1 * | 2/2004 | Lee | G06K 9/00013 250/556 |
| 2004/0170307 A1 * | 9/2004 | Manansala | G06K 9/00026 382/126 |
| 2010/0077143 A1 * | 3/2010 | Reid | G06F 11/348 711/118 |
| 2016/0350577 A1 * | 12/2016 | Yang | G06K 9/0002 |
| 2016/0358006 A1 * | 12/2016 | Zhan | G06K 9/0002 |
| 2016/0364596 A1 * | 12/2016 | Zhan | G06K 9/0002 |
| 2017/0118642 A1 * | 4/2017 | Fukui | H04L 63/083 |
| 2017/0235992 A1 * | 8/2017 | Zhan | G06K 9/0002 382/124 |
| 2017/0243044 A1 * | 8/2017 | Tan | G06K 9/001 |

FOREIGN PATENT DOCUMENTS

| | | |
|---|---|---|
| CN | 101253512 A | 8/2008 |
| CN | 104268530 A | 1/2015 |
| KR | 10-2006-0000701 A | 1/2006 |

* cited by examiner

*Primary Examiner* — Amir Alavi

(57) ABSTRACT

The present disclosure discloses a fingerprint detection circuit, including a plurality of detection units arranged in an array and a summing unit. The detection units include a first detection unit and a second detection unit being respectively connected to the summing unit. The summing unit conducts a summing operation for an output signal of each second detection unit and an output signal of the first detection unit to cancel a base signal in the output signal of each second detection unit to acquire a useful signal including fingerprint information.

17 Claims, 4 Drawing Sheets

FINGERPRINT DETECTION CIRCUIT, AND CAPACITIVE FINGERPRINT SENSOR AND MOBILE TERMINAL THEREOF

CROSS-REFERENCE TO RELATED APPLICATIONS

The present application is a continuation of international application No. PCT/CN2015/073823, filed on Mar. 6, 2015, which claims priority to Chinese Patent Application No. 201410515210.4, filed on Sep. 29, 2014, both of which are hereby incorporated by reference in its entireties.

TECHNICAL FIELD

The present disclosure relates to the technical field of identity identification, and in particular, relates to a fingerprint detection circuit and a capacitive fingerprint sensor and a mobile terminal thereof.

BACKGROUND

With the social and technology developments, in recent years, mobile banks, mobile wallets, on-line shopping and the like e-commerce services are more and more widely promoted on smart mobile devices. Correspondingly, users are imposing higher and higher requirements on performance of integrated electronic elements and security of network information. Fingerprints, due to uniqueness and stability thereof, have become an effective means to identify user identities. There are a plurality of types of fingerprint sensors. Currently, three types of fingerprint sensors are prevailing: optical imaging fingerprint sensors, crystal capacitive (or pressure-sensitive) fingerprint sensors and ultrasonic imaging fingerprint sensors. An optical device acquires fingerprint images by using the full reflection principle and by using a CCD device, which achieves a better effect. However, the device is abrasion resistant, but the cost is high and the volume is large, which is thus unsuitable for mobile terminals having a high requirement on integration. An ultrasonic imaging directly scans dermal tissues, and thus dirt or oil accumulated on the skin surface cause less impact to acquisition of the image. However, the cost of the device is extremely high, and currently there is no matured product market. The crystal capacitive fingerprint sensor is manufactured according to standard CMOS technique, and acquires quality images (image quality achieved by improving the gain by using software). In addition, this fingerprint sensor has small size and low power consumption, and thus the cost thereof is much lower than that of the other sensors.

The crystal capacitive fingerprint sensor includes a plurality of detection units arranged in an array. When a finger touches the detection unit, the fingerprint unit is equivalent to an anode of a capacitor, the skin of the finger becomes a cathode of the capacitor, and the capacitance (or inductance) is different because a practical distance from the fingerprint of the finger to the detection unit is different due to different depths of the grain of the finger (that is, "ridges" and "valleys" of the finger). A fingerprint image formed by ridges and valleys of the finger may be detected according to this principle. FIG. 1 illustrates a commonly used fingerprint detection circuit in a fingerprint detection system. An input signal VIN_1 from a finger and a canceling signal VCAN from a high-precision signal source are simultaneously input to the detection unit; and in an output signal VPXL_1 of the detection unit, a dotted-line portion represents a useful signal amplitude of the fingerprint information, and a solid-line portion represents a base signal amplitude. This method may be defective in that, firstly, an amplitude of the VCAN signal output from the high-precision signal source fails to follow VIN_1 which may dynamically change (this is because VIN_1-VIN_n are determined by a coupling capacitance between the finger and the detection unit, and the coupling capacitance may dynamically change). Therefore, the signal amplitude of VPXL_1 may still include a portion of base signal amplitudes, and the final output signal VOUT_1 upon amplification by an amplifier is also the same. Secondly, assume that VIN_1 is fixed, to acquire an ideal base signal cancellation effect, high requirements are imposed on the indicators of the high-precision signal source, and thus implementation of the corresponding signal source inside the chip may cause higher cost and more power consumption.

SUMMARY

The present disclosure is intended to provide a fingerprint detection circuit and a capacitive fingerprint sensor and a mobile terminal thereof, which may improve capabilities of canceling base signals and further enhance fingerprint identification precision.

To this end, the present disclosure provides a fingerprint detection circuit, including a plurality of detection units arranged in an array, and further including a summing unit; wherein the detection units include a first detection unit and a second detection unit, the first detection unit and the second detection unit being respectively connected to the summing unit, the summing unit conducting a summing operation for an output signal of each second detection unit and an output signal of the first detection unit to cancel a base signal in the output signal of each second detection unit to acquire a useful signal including fingerprint information.

In one embodiment, the second detection unit is connected to a positive-phase input of the summing unit, and the first detection unit is connected to a negative-phase input of the summing unit.

The fingerprint detection circuit further includes a first amplifier, wherein the first amplifier amplifies a signal output by the summing unit.

Preferably, the number of the first detection unit is one.

In one embodiment, the detection unit includes a second amplifier, a first capacitor, a second capacitor and a third capacitor; wherein one terminal of the first capacitor is connected to an input signal of a finger, and the other terminal of the first capacitor is connected to a negative-phase input of the second amplifier; the second capacitor is connected between the negative-phase input of the second amplifier and a positive-phase input of the second amplifier; one terminal of the third capacitor is connected to the negative-phase input of the second amplifier, and the other terminal of the third capacitor is connected to an output of the second amplifier; and the positive-phase input of the second amplifier is grounded.

In one embodiment, the detection unit includes a second amplifier, a first capacitor, a second capacitor and a third capacitor; wherein one terminals of both the first capacitor and the second capacitor are grounded, and the other terminals of both the first capacitor and the second capacitor are connected to a negative-phase input of the second amplifier; one terminal of the third capacitor is connected to the negative-phase input of the second amplifier, and the other terminal of the third capacitor is connected to an output of the second amplifier; and a positive-phase input of the second amplifier is connected to an input signal of a finger.

In one embodiment, the summing unit includes a third amplifier, a positive-phase input of the third amplifier being connected to an output of the second detection unit, and a negative-phase input of the third amplifier being connected to an output of the first detection unit.

The summing unit further includes a first resistor, a second resistor, a third resistor and a fourth resistor; wherein the first resistor is connected between the output of the first detection unit and the negative-phase input of the third amplifier; the second resistor is connected between the output of the second detection unit and the positive-phase input of the third amplifier; one terminal of the third resistor is connected to the positive-phase input of the third amplifier, and the other terminal of the third resistor is grounded; and one terminal of the fourth resistor is connected to the negative-phase input of the third amplifier, and the other terminal of the fourth resistor is connected to an output of the third amplifier.

In addition, the present disclosure further provides a capacitive fingerprint sensor, including a fingerprint detection panel, and a fingerprint detection region located on the fingerprint detection panel, wherein the fingerprint detection circuit as described above is arranged in the fingerprint detection region.

Moreover, the present disclosure further provides a mobile terminal, including the capacitive fingerprint sensor as described above.

In the fingerprint detection circuit according to the present application, at least one detection unit is selected as a canceling unit, and a summing operation is performed for output signals of the other detection units and an output signal of the at least one detection unit to cancel a base signal in the output signals of the other detection units. Compared with the related art, capabilities of canceling base signals are improved, and fingerprint identification precision is further enhanced.

Further, as compared with the fingerprint detection circuit employing a high-precision signal source, the summing circuit is simple in structure, occupies a small chip area, and may implement low power consumption.

The attainment of the objectives, functional features and advantages of the present disclosure are further described hereinafter with reference to the specific embodiments and the accompanying drawings.

DETAILED DESCRIPTION

It should be understood that the embodiments described here are only exemplary ones for illustrating the present disclosure, and are not intended to limit the present disclosure.

Figure 2:
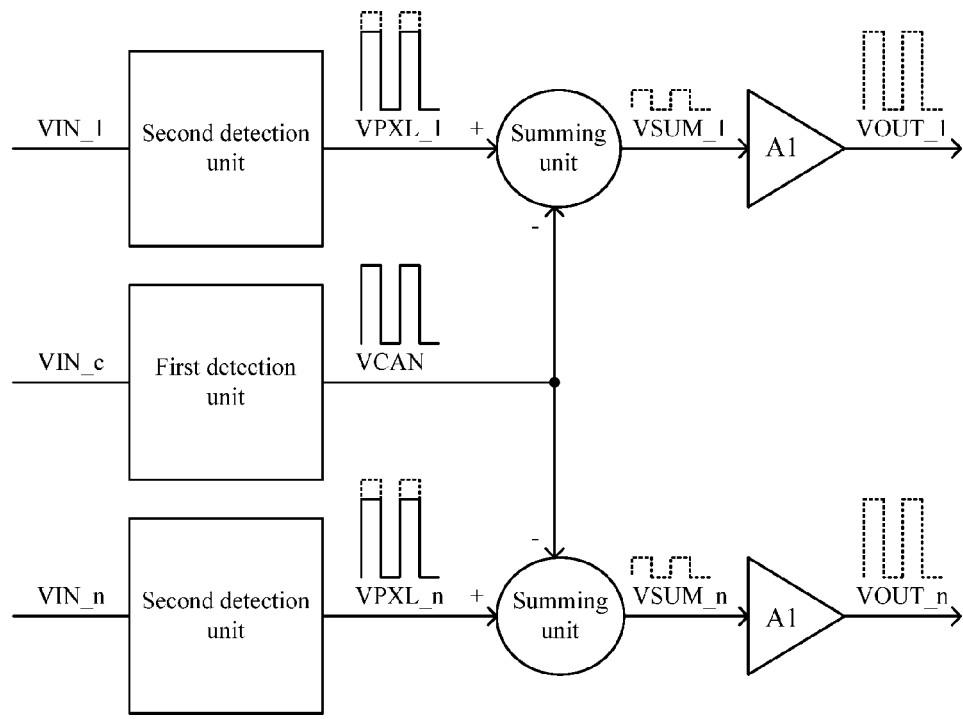
FIG. 2 is a schematic diagram of a fingerprint detection circuit of a capacitive fingerprint sensor according to an embodiment of the present disclosure.
Figure 3:
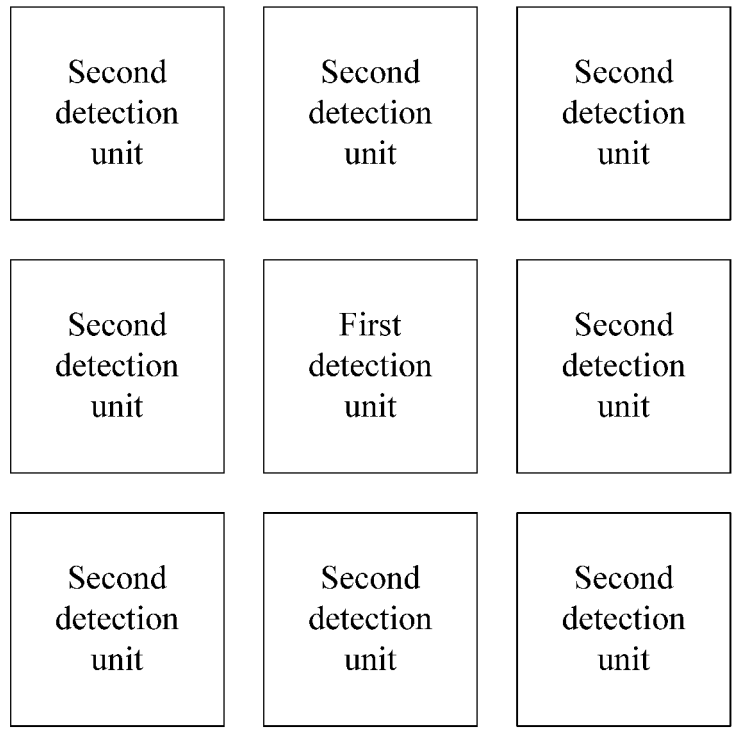
FIG. 3 is a schematic diagram of distribution of detection units of the capacitive fingerprint sensor according to an embodiment of the present disclosure.

A capacitive fingerprint sensor according to an embodiment of the present disclosure includes: a fingerprint detection panel, and a fingerprint detection region located on the fingerprint detection panel, wherein a fingerprint detection circuit is arranged in the fingerprint detection region. As illustrated in FIG. 2, FIG. 2 is a schematic diagram of a fingerprint detection circuit, wherein the fingerprint detection circuit includes a plurality of detection units arranged in an array, a summing unit and a first amplifier A1. As illustrated in FIG. 3, in this embodiment, any one detection unit (nevertheless, more than one detection unit may also be selected) is selected from the plurality of detection units as a first detection unit, and the remaining detection units serve as second detection units. Outputs of both the first detection unit and the second detection units are connected to the summing unit, and the summing unit conducts a summing operation for an output signal of each second detection unit and an output signal of the first detection unit to cancel a base signal in the output signal of each second detection unit to acquire a useful signal including fingerprint information. The first amplifier A1 amplifies the signal output by the summing unit.

Figure 4:
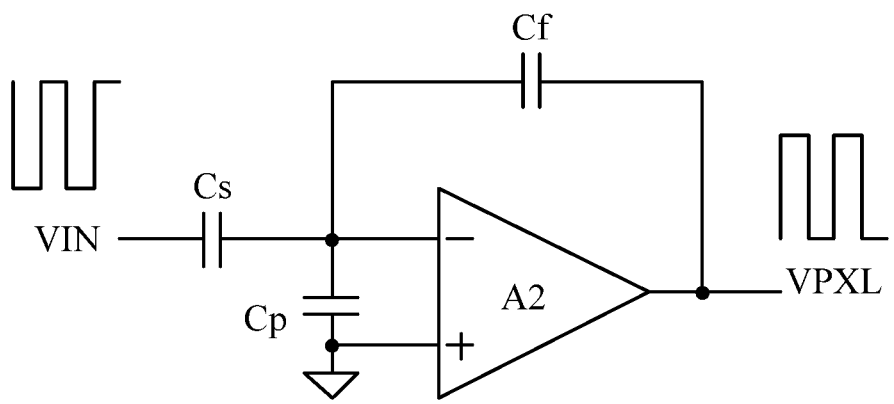
FIG. 4 is a schematic circuit diagram of one detection unit of the capacitive fingerprint sensor according to an embodiment of the present disclosure.
Figure 5:
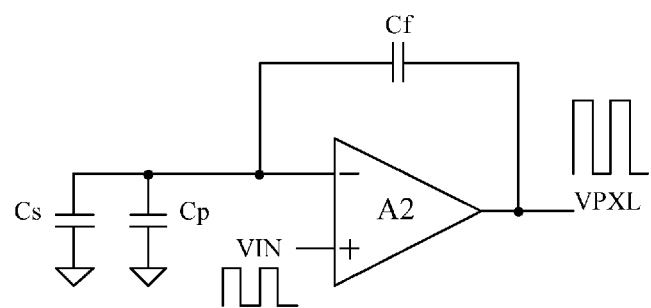
FIG. 5 is a schematic circuit diagram of another detection unit of the capacitive fingerprint sensor according to an embodiment of the present disclosure.

FIG. 4 and FIG. 5 schematically illustrate two types of the specific circuits of the detection unit. The detection unit as illustrated in FIG. 4 includes: a second amplifier A2, a first capacitor Cs, a second capacitor Cp and a third capacitor Cf; wherein Cs represents a coupling capacitance between a finger and the detection unit, Cf represents a feedback capacitor inside the detection unit, and Cp represents a parasitic capacitor inside the detection unit. When the detection unit detects a valley of the fingerprint, Cs takes a minimum value Csmin; and when the detection unit detects a ridge of the fingerprint, Cs takes a maximum value Csmax. One terminal of the first capacitor Cs is connected to an input signal of a finger, and the other terminal of the first capacitor Cs is connected to a negative-phase input of the second amplifier A2. The second capacitor Cp is connected between the negative-phase input of the second amplifier A2 and a positive-phase input of the second amplifier A2. One terminal of the third capacitor Cf is connected to the negative-phase input of the second amplifier A2, and the other terminal of the third capacitor Cf is connected to an output terminal of the second amplifier A2. The positive-phase input of the second amplifier A2 is grounded.

The detection unit as illustrated in FIG. 5 includes: a second amplifier A2, a first capacitor Cs, a second capacitor Cp and a third capacitor Cf; wherein Cs represents an coupling capacitance between a finger and the detection unit, Cf represents a feedback capacitor inside the detection unit, and Cp represents a parasitic capacitor inside the detection unit. When the detection unit detects a valley of the fingerprint, Cs takes a minimum value Csmin; and when the detection unit detects a ridge of the fingerprint, Cs takes a maximum value Csmax. One terminals of both the first capacitor Cs and the second capacitor Cp are grounded, and the other terminals thereof are connected to the negative-phase input of the second amplifier A2. One terminal of the third capacitor Cf is connected to a negative-phase input of the second amplifier A2, and the other terminal of the third capacitor Cf is connected to an output terminal of the second amplifier A2. A positive-phase input of the second amplifier A2 is connected to an input signal of a finger.

Figure 6:
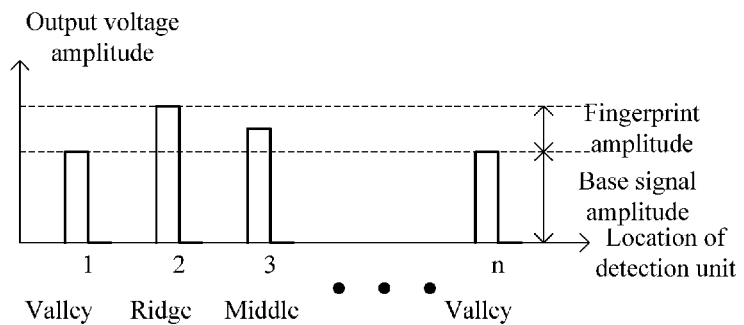
FIG. 6 is a schematic diagram of a base signal amplitude of a fingerprint signal of the capacitive fingerprint sensor according to an embodiment of the present disclosure.

Referring to FIG. 6, since a ridge of the fingerprint corresponds to a greatest signal amplitude whereas a valley of the fingerprint corresponds to a smallest signal amplitude, it may be considered that a signal amplitude corresponding to the valley of the fingerprint is a base signal amplitude. For brevity of description, assume that VIN_c is the signal amplitude corresponding to the valley of the fingerprint. VPXL_1 is connected to a positive-phase input of a summing unit, VCAN is connected to a negative-phase input of the summing unit, and an output signal VSUM_1 of the summing unit is equal to VPXL_1-VCAN. Therefore, the signal VSUM_1 includes only a useful signal amplitude of the fingerprint information, and the base signal amplitude is absolutely cancelled. A signal VOUT_1 obtained upon amplification of VSUM_1 through the first amplifier A1 enable the useful signal amplitude representing the fingerprint information to be amplified as much as possible.

Figure 7:
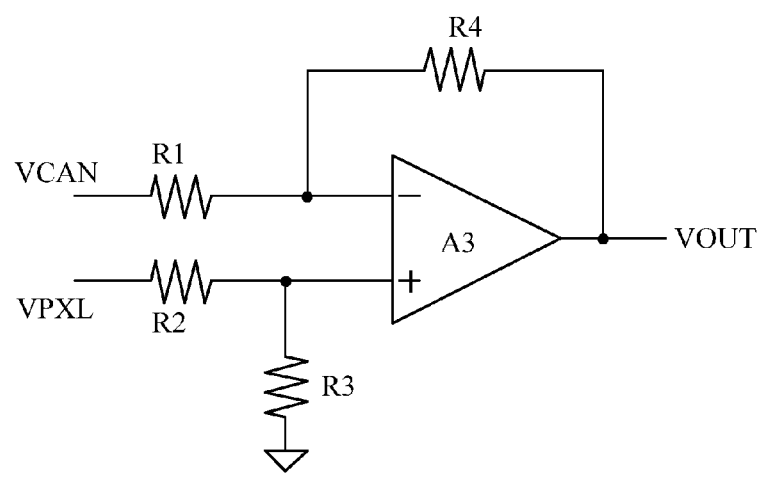
FIG. 7 is a schematic circuit diagram of a summing unit of the capacitive fingerprint sensor according to an embodiment of the present disclosure.

Referring to FIG. 7, in this embodiment, the summing unit includes a third amplifier A3, wherein a positive-phase input of the third amplifier A3 is connected to an output of the second detection unit, and a negative-phase input of the third amplifier A3 is connected to an output of the first detection unit.

The summing unit further includes: a first resistor R1, a second resistor R2, a third resistor R3 and a fourth resistor R4. The first resistor R1 is connected between the output of the first detection unit and the negative-phase input of the third amplifier A3. The second resistor R2 is connected between the output of the second detection unit and the positive-phase input of the third amplifier A3. One terminal of the third resistor R3 is connected to the positive-phase input of the third amplifier A3, and the other terminal of the third resistor R3 is grounded. One terminal of the fourth resistor R4 is connected to the negative-phase input of the third amplifier A3, and the other terminal of the fourth resistor R4 is connected to an output of the third amplifier A3.

Hereinafter, calculation description in a base signal cancellation circuit of a fingerprint detection system using the capacitive fingerprint sensor according to the present disclosure is given based on common circuit parameters.

Figure 1:
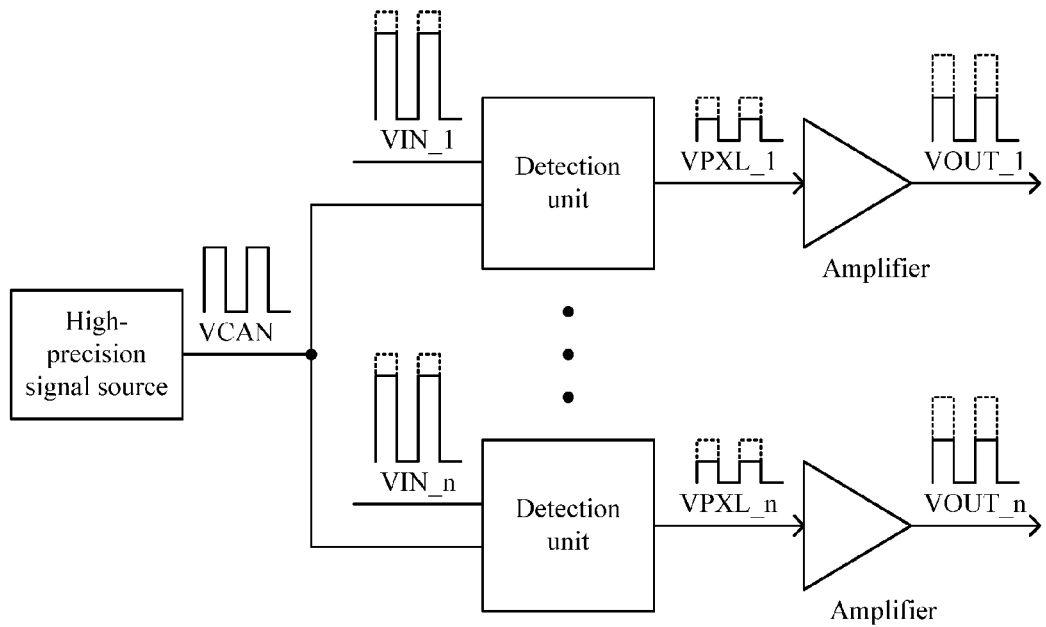
FIG. 1 is a schematic diagram of a fingerprint detection circuit of a capacitive fingerprint sensor in the related art.

With respect to the common circuit in FIG. 1, the VCAN amplitude is a fixed value, and a transfer function of the circuit is:

$$VOUT\_1 = G2*VPXL\_1 = G2*G1*(k*VIN\_1-VCAN)$$

Assume that an amplifier gain G2=10, a detection unit gain G1=5, a coupling capacitance change coefficient k=1.01, a finger signal amplitude VIN_1=1 V (a useful fingerprint amplitude proportion is 1%, that is, VSIG=0.01 V, VBS=0.99 V, VIN_1=VSIG+VBS), and a high-precision signal source output amplitude VCAN=0.99 V, then it may be calculated $$\begin{aligned}VOUT\_1 &= G2*G1*(k*(VSIG+VBS)-VCAN)\\ &= G2*G1*(1.01*VSIG+0.01VBS)\\ &= 50*1.01*VSIG+50*0.01*VBS\end{aligned}$$

$$\begin{aligned}&= 0.505\ V + 0.495\ V\\ &= 1\ V\end{aligned}$$

The fingerprint amplitude is 0.505 V, and the base signal amplitude is 0.495 V. (The base signal amplitude upon cancellation is reduced from 99% to 49.5%).

With respect to a base signal cancellation circuit of a fingerprint detection system using the capacitive fingerprint sensor according to the present disclosure, a transfer function of the circuit is:

$$VOUT\_1=G2*VSUM\_1=G2*(VPXL\_1-VCAN)=G2*G1*k*(VIN\_1-VIN\_c)$$

Assume that a first amplifier A1 gain G2=10, a detection unit gain G1=5, a coupling capacitance change coefficient k=1.01, a finger signal amplitude VIN_1=1 V (a useful fingerprint amplitude proportion is 1%, that is, VSIG=0.01 V, VBS=0.99V, VIN_1=VSIG+VBS). It may be calculated:

$$VOUT\_1=G2*G1*k*(VIN\_1-VIN\_c)=0.505\ V$$

All the VOUT_1 signal amplitudes are useful fingerprint amplitudes. (The base signal amplitude upon cancellation is reduced from 99% to 0%).

When an amplitude of the output voltage of the first amplifier A1 is constant, in the base signal cancellation circuit of the fingerprint detection system according to the present disclosure, the gain G2 of the first amplifier A1 may be defined to a greater value, to acquire a greater useful fingerprint amplitude, so as to improve fingerprint identification precision.

In the fingerprint detection circuit according to the present application, at least one detection unit is selected as a canceling unit, and a summing operation is performed for output signals of the other detection units and an output signal of the at least one detection unit to cancel a base signal in the output signals of the other detection units. This improves capabilities of canceling base signals and further enhances fingerprint identification precision. As compared with a canceling circuit employing a high-precision signal source in the related art, the summing circuit is simple in structure, occupies a small chip area, and may implement low power consumption.

Moreover, the present disclosure further provides a mobile terminal, including the capacitive fingerprint sensor as described above.

It should be understood that described above are merely exemplary embodiments of the present disclosure, but are not intended to limit the scope of the present disclosure. Any equivalent structure or equivalent process variation made based on the specification and drawings of the present disclosure, which is directly or indirectly applied in other related technical fields, fall within the scope of the present disclosure.

INDUSTRIAL APPLICABILITY

In the fingerprint detection circuit according to the present application, at least one selection unit is selected as a canceling unit, and a summing operation is performed for output signals of the other detection units and an output signal of the at least one detection unit to cancel a base signal in the output signal of the at least one detection unit. Compared with the related art, capabilities of canceling base signals are improved, and fingerprint identification precision is further enhanced.

Further, as compared with the fingerprint detection circuit employing a high-precision signal source, the summing circuit is simple in structure, occupies a small chip area, and may implement low power consumption.

What is claimed is:

1. A fingerprint detection circuit module, comprising:
   a plurality of detection circuits arranged in an array, wherein the detection circuits comprise a first detection circuit and a second detection circuit; and
   a summing circuit, wherein the first detection circuit and the second detection circuit are respectively connected to the summing circuit, and the summing circuit is configured to conduct a summing operation for an output signal of the second detection circuit and an output signal of the first detection circuit to cancel a base signal in the output signal of the second detection circuit to acquire a useful signal comprising fingerprint information, wherein the second detection circuit is connected to a positive-phase input of the summing circuit, and the first detection circuit is connected to a negative-phase input of the summing circuit.

2. The fingerprint detection circuit module according to claim 1, wherein the summing circuit comprises a third amplifier, a positive-phase input of the third amplifier being connected to an output of the second detection circuit, and a negative-phase input of the third amplifier being connected to an output of the first detection circuit.

3. The fingerprint detection circuit module according to claim 2, wherein the summing circuit further comprises a first resistor, a second resistor, a third resistor and a fourth resistor; wherein the first resistor is connected between the output of the first detection circuit and the negative-phase input of the third amplifier; the second resistor is connected between the output of the second detection circuit and the positive-phase input of the third amplifier; one terminal of the third resistor is connected to the positive-phase input of the third amplifier, and the other terminal of the third resistor is grounded; and one terminal of the fourth resistor is connected to the negative-phase input of the third amplifier, and the other terminal of the fourth resistor is connected to an output of the third amplifier.

4. The fingerprint detection circuit module according to claim 1, further comprising a first amplifier, wherein the first amplifier is configured to amplify a signal output by the summing circuit.

5. The fingerprint detection circuit module according to claim 1, wherein the number of the first detection circuit is one.

6. The fingerprint detection circuit module according to claim 1, wherein the detection circuits comprise a second amplifier, a first capacitor, a second capacitor and a third capacitor; wherein one terminal of the first capacitor is connected to an input signal of a finger, and the other terminal of the first capacitor is connected to a negative-phase input of the second amplifier; the second capacitor is connected between the negative-phase input of the second amplifier and a positive-phase input of the second amplifier; one terminal of the third capacitor is connected to the negative-phase input of the second amplifier, and the other terminal of the third capacitor is connected to an output of the second amplifier; and the positive-phase input of the second amplifier is grounded.

7. The fingerprint detection circuit module according to claim 1, wherein the detection circuits comprise a second amplifier, a first capacitor, a second capacitor and a third capacitor; wherein one terminals of both the first capacitor and the second capacitor are grounded, and the other terminals of both the first capacitor and the second capacitor are connected to a negative-phase input of the second amplifier; one terminal of the third capacitor is connected to the negative-phase input of the second amplifier, and the other terminal of the third capacitor is connected to an output of the second amplifier; and a positive-phase input of the second amplifier is connected to an input signal of a finger.

8. A capacitive fingerprint sensor, comprising:
   a fingerprint detection panel;
   a fingerprint detection region located on the fingerprint detection panel; and
   a fingerprint detection circuit module arranged in the fingerprint detection region, wherein the fingerprint detection circuit module comprises a plurality of detection circuits arranged in an array and a summing circuit, wherein the detection circuits comprise a first detection circuit and a second detection circuit and the first detection circuit and the second detection circuit are respectively connected to the summing circuit, wherein the summing circuit is configured to conduct a summing operation for an output signal of the second detection circuit and an output signal of the first detection circuit to cancel a base signal in the output signal of the second detection circuit to acquire a useful signal comprising fingerprint information, wherein the second detection circuit is connected to a positive-phase input of the summing circuit, and the first detection circuit is connected to a negative-phase input of the summing circuit.

9. The capacitive fingerprint sensor according to claim 8, wherein the summing circuit comprises a third amplifier, a positive-phase input of the third amplifier being connected to an output of the second detection circuit, and a negative-phase input of the third amplifier being connected to an output of the first detection circuit.

10. The capacitive fingerprint sensor according to claim 9, wherein the summing circuit further comprises a first resistor, a second resistor, a third resistor and a fourth resistor; wherein the first resistor is connected between the output of the first detection circuit and the negative-phase input of the third amplifier; the second resistor is connected between the output of the second detection circuit and the positive-phase input of the third amplifier; one terminal of the third resistor is connected to the positive-phase input of the third amplifier, and the other terminal of the third resistor is grounded; and one terminal of the fourth resistor is connected to the negative-phase input of the third amplifier, and the other terminal of the fourth resistor is connected to an output of the third amplifier.

11. The capacitive fingerprint sensor according to claim 8, further comprising a first amplifier, wherein the first amplifier is configured to amplify a signal output by the summing circuit.

12. The capacitive fingerprint sensor according to claim 8, wherein the number of the first detection circuit is one.

13. The capacitive fingerprint sensor according to claim 8, wherein the detection circuits comprise a second amplifier, a first capacitor, a second capacitor and a third capacitor; wherein one terminal of the first capacitor is connected to an input signal of a finger, and the other terminal of the first capacitor is connected to a negative-phase input of the second amplifier; the second capacitor is connected between the negative-phase input of the second amplifier and a positive-phase input of the second amplifier; one terminal of the third capacitor is connected to the negative-phase input of the second amplifier, and the other terminal of the third capacitor is connected to an output of the second amplifier; and the positive-phase input of the second amplifier is grounded.

14. The capacitive fingerprint sensor according to claim 8, wherein the detection circuits comprise a second amplifier, a first capacitor, a second capacitor and a third capacitor; wherein one terminals of both the first capacitor and the second capacitor are grounded, and the other terminals of both the first capacitor and the second capacitor are connected to a negative-phase input of the second amplifier; one terminal of the third capacitor is connected to the negative-phase input of the second amplifier, and the other terminal of the third capacitor is connected to an output of the second amplifier; and a positive-phase input of the second amplifier is connected to an input signal of a finger.

15. A mobile terminal, comprising a capacitive fingerprint sensor, wherein the capacitive sensor comprises a fingerprint detection circuit module, wherein the fingerprint detection circuit module comprises a plurality of detection circuits arranged in an array and a summing circuit, wherein the detection circuits comprise a first detection circuit and a second detection circuit and the first detection circuit and the second detection circuit are respectively connected to the summing circuit, wherein the summing circuit is configured to conduct a summing operation for an output signal of the second detection circuit and an output signal of the first detection circuit to cancel a base signal in the output signal of the second detection circuit to acquire a useful signal comprising fingerprint information, wherein the second detection circuit is connected to a positive-phase input of the summing circuit, and the first detection circuit is connected to a negative-phase input of the summing circuit.

16. The mobile terminal according to claim 15, further comprising a first amplifier, wherein the first amplifier is configured to amplify a signal output by the summing circuit.

17. The mobile terminal according to claim 15, wherein the number of the first detection circuit is one.

\* \* \* \* \*